United States Patent [19]

Kiilunen

[11] Patent Number: 4,782,211

[45] Date of Patent: Nov. 1, 1988

[54] METHOD OF WELDING AND PRODUCT OBTAINED THEREFROM

[75] Inventor: Matt Kiilunen, Brighton, Mich.

[73] Assignee: Weld Mold Company, Brighton, Mich.

[21] Appl. No.: 40,586

[22] Filed: Apr. 21, 1987

Related U.S. Application Data

[63] Continuation-in-part of Ser. No. 806,532, Dec. 9, 1985, Pat. No. 4,673,796.

[51] Int. Cl.$^4$ .......................... B23K 9/24; B23K 35/36
[52] U.S. Cl. ......................... 219/137 R; 219/137 WM; 219/145.23
[58] Field of Search ............ 219/137 WM, 137 R, 75, 219/146.1, 145.1, 145.23, 145.22

[56] References Cited

U.S. PATENT DOCUMENTS

| | | | |
|---|---|---|---|
| 1,437,257 | 11/1922 | Mattice | 219/146.1 X |
| 2,345,758 | 4/1944 | Lincoln et al. | 219/137 R |
| 2,520,112 | 8/1950 | Bourque et al. | 219/145.22 |
| 2,964,612 | 12/1960 | Savard et al. | 219/137 WMX |
| 4,349,721 | 9/1982 | Mentink et al. | 219/145.23 |

FOREIGN PATENT DOCUMENTS

| | | | |
|---|---|---|---|
| 1040351 | 4/1976 | Japan | 219/145.23 |
| 2065144 | 5/1977 | Japan | 219/145.23 |

*Primary Examiner*—E. A. Goldberg
*Assistant Examiner*—Catherine M. Sigda
*Attorney, Agent, or Firm*—Bertram F. Claeboe

[57] ABSTRACT

A cluster welding electrode assembly is provided which permits the deposition of maximum weights of weld metal with minimum amperage and voltage values. The assembly is comprised of a central rod electrode having circumferentially grouped or nested thereabout in longitudinally aligned relationship a plurality of lesser diameter rod electrodes. Each of the rods in the assembly carries thereon a novel flux coating productive during the welding operation of a nickel-chromium-molybdenum type alloy characterized as dense, porous-free and homogenous. The flux composition incorporates defined amounts of molybdenum and tungsten, and there is obtained by practice of the invention weld metal of low carbon content and substantially improved physical properties.

6 Claims, No Drawings

METHOD OF WELDING AND PRODUCT OBTAINED THEREFROM

BACKGROUND OF THE INVENTION

This application is a continuation-in-part of my copending application Ser. No. 806,532 filed Dec. 9, 1985, now U.S. Pat. No. 4,673,796 granted June 16, 1987.

In the noted earlier filed case there is disclosed a cluster electrode formed of a central rod and individual rods nested thereabout, each rod in the bundle comprising the cluster electrode being of low carbon steel and exteriorly coated with a novel flux composition. By so proceeding, there is obtained the deposition of maximum weights of liquid weld metal utilizing minimum current and voltage values. The solidified weld metal produced in this manner was found to exhibit certain enhanced physical properties.

The flux composition in my copending application includes defined quantities of calcium carbonate ($CaCO_3$) and calcium fluoride ($CaF_2$). These function importantly in combination as slag formers, as well as being arc stabilizers and cleansing agents. The combination gives proper burn-off or melting rate and good cleansing of the metal.

Additional metals or minerals in the flux composition are particular amounts of manganese, silicon, iron, chromium, and silicates. It is also noted in the mentioned patent application that the flux formulation may also include defined ranges of molybdenum, tungsten, nickel, vanadium, and titanium.

SUMMARY OF THE INVENTION

The general environment for applicant's discoveries is illustratively the repair of worn-out areas on a workpiece, engineering changes on a particular part, providing complete impressions which may involve flooding an impression full on a forging die that is to be machined, and correcting machining errors. Typical applications for this invention are forge dies, press dies, trim dies, hammer bases, rams, sow blocks, columns and tie plates, and any relatively heavy industrial equipment requiring repair.

It has now been discovered that the physical properties of the weld metal, particularly in the area of hardness values, are enhanced by the addition of defined amounts of molybdenum and tungsten. The latter metal in particular appears to modify the hot working characteristics of the weld metal, and as well, permits the metal to maintain its hardness under heat. Additionally, it has been discovered that the alloys of the flux composition have a dilution effect upon the carbon content of the weld metal, permitting the percent by weight of carbon in the weld metal to be as low as 0.01 to 0.15 percent by weight. No doubt contributing to these highly desirable results is the phenomenon which apparently takes place in the welding method employing the cluster electrode configuration and flux coating thereon of my earlier filed patent application.

DESCRIPTIONS OF THE PREFERRED EMBODIMENT

In accordance with my invention, a cluster electrode as the term is employed herein refers to the general type of construction shown in U.S. Pat. No. 2,520,112 issued Aug. 29, 1950 in the names Philip Bourque and Matt Kiilunen. More specifically, however, a cluster electrode within the purview of the instant invention embodies a solid central low carbon steel electrode about which are circumferentially grouped a plurality of solid lesser diameter low carbon steel electrodes. The lesser diameter electrodes and rod electrode are in longitudinal alignment, and means may be provided for maintaining the central electrode or core rod and the lesser diameter rod electrodes in a cluster relationship.

It is of significance in the production of a weld deposit of the nickel-chromium-molybdenum type, for purposes of assuring that the weld deposit or weld metal will be dense, porous-free and homogenous, that each of the rod electrodes be provided with a tightly adherent flux coating thereon having substantially the following composition:

| INGREDIENT | FROM ABOUT WEIGHT % TO ABOUT % WEIGHT |
|---|---|
| Manganese | 2 to 12 |
| Silicon | 2 to 10 |
| Iron | 5 to 35 |
| $CaCO_3$ | 20 to 60 |
| $CaF_2$ | 8 to 35 |
| Chromium | 3 to 12 |
| Silicate | 5 to 15 |
| Molybdenum | 0.05 to 10 |
| Tungsten | 0.05 to 10 |
| Nickel | 0.10 to 15 |
| Titanium | 0 to 15 |
| Vanadium | 0 to 3 |

A more specific flux formulation productive of effective results in association with a cluster electrode may be as follows:

EXAMPLE

| INGREDIENT | APPROXIMATE PARTS BY WEIGHT |
|---|---|
| Manganese | 6 |
| Silicon | 8 |
| Iron | 10 |
| $CaCO_3$ | 50 |
| $CaF_2$ | 20 |
| Chromium | 12 |
| Silicate | 4 |
| Molybdenum | 6 |
| Nickel | 8 |
| Tungsten | 1.5 |

However, subsequent investigations by applicant has revealed that remarkable improvements in the physical properties of a low carbon alloy steel body, or weld metal, are achieved by the addition to the flux composition of a controlled amount of tungsten, preferably in the form of the ferrotungsten alloy. The tungsten in the flux formulation appears to modify the hot working characteristics of the weld metal, and assists markedly in the product maintaining its hardness under elevated temperatures. The product has excellent ductibility, and is cold formable to the extent that specimens can be bent back upon themselves without noticeable signs of fracture. The metal body may be employed as cast, and forging is not required. There is no need for hardening and then tempering. Excellent results are achieved when the formed metal body is precipitation hardened by permitting it to air cool, and then tempered at 700° to 1200° F. for one hour per each inch of thickness of the body.

In the broader flux composition above set forth, the tungsten is preferably present in an amount of from about 0.05% to about 10% by weight. In the more specific formulation of the Example appearing hereinabove, an addition of 1.5 parts by weight of tungsten gives particularly good results in the end product.

Samples of weld metal produced from applicant's cluster electrode, and after the noted heat treatment not involving separate hardening were analyzed with the following results, the balance therein being iron:

| INGREDIENT | FROM ABOUT % WEIGHT TO ABOUT % WEIGHT |
|---|---|
| Carbon | 0.01 to 0.15 |
| Manganese | 0.50 to 2.00 |
| Silicon | 0.05 to 1.00 |
| Chromium | 0.50 to 5.00 |
| Molybdenum | 0.25 to 2.50 |
| Nickel | 0.50 to 5.00 |
| Tungsten | 0.25 to 1.50 |
| Vanadium | 0 to 1.50 |
| Columbium | 0 to 1.00 |
| Cobalt | 0 to 2.00 |

An analysis of a weld metal product obtained by the more specific flux composition of the Example revealed the following results, the balance therein being iron:

| INGREDIENT | FROM ABOUT % WEIGHT TO ABOUT % WEIGHT |
|---|---|
| Carbon | 0.06 |
| Manganese | 1.35 |
| Silicon | 0.08 to 0.10 |
| Chromium | 3.00 to 3.50 |
| Molybdenum | 1.00 to 2.00 |
| Nickel | 1.50 |
| Tungsten | 0.25 to 1.50 |

Random sampling of weld metal products obtained in accordance with the described inventive concepts displayed the following mechanical properties:

| | |
|---|---|
| Yield strength, psi | 100,000 to 150,000 |
| Tensile strength, psi | 100,000 to 190,000 |
| Elongation, % | 15 to 30 |
| Reduction in area, % | 30 to 70 |
| Hardness, Bhn. | 195 to 500 |

In the welding operation, the central relatively large diameter electrode and the surrounding lesser diameter electrodes are constituted of mild or low carbon steel, generally about 0.04 to 0.12 percent by weight carbon. This type steel is designated in the trade as C-1004 to C-1012, although other grades may upon occasion be found to be suitable. The central or core electrode may illustratively have a length of about 48 inches and an approximate diameter of about 0.8137 inches. The relatively smaller diameter rod electrodes, on the other hand, are generally of a length of up to approximately 47 inches and a diameter of about 0.250 inches. Substantial variations in the composition of the rods and the dimensions thereof may of course be effected as the particular welding application may require. Thickness of the flux coating may also vary, however, on a core rod electrode having a diameter of about 0.8137 inches, a coating of approximately 0.0463 inches in thickness is generaly applied. The lesser diameter surrounding rod electrodes with 0.250 inch diameters generally carry a 0.150 inch thickness flux coating.

The foregoing parameters were adhered to in the welding operation wherein the voltage was controlled between about 26 and 30 volts and the current between approximately 1500 and 2400 amperes. It was noted that substantially in excess of 90 pounds of solid weld metal was deposited per hour, and that the weld metal upon solidification was dense, porous-free, and homogenous. The superior mechanical properties of the weld metal are tabulated hereinabove.

It should be noted that flux coatings have at least three important functions on shielded arc electrodes. First, they promote electrical conductivity across the arc column by ionization of the developed gases. Second, they produce a shielding gas (basically $CO_2$) that excludes the atmosphere from the weld puddle. Third, such coatings add slag-forming materials to the molten weld puddle for grain refinement and, in some cases, for alloy addition to the weld. These functions deal principally with chemical protection. In the area of mechanical protection, the coating insulates the sides of the electrode so that the arc is concentrated at the end of the electrode into a confined area. This is important and will facilitate welding in a deep "U" or "V" groove. Additionally, the coating is effective to produce a cup, cone or sheath at the tip of the electrode, which acts much like a crucible, providing a mechanical shield, concentrating and directing the arc, reducing the thermal losses, and increasing the temperature on the end of the electrode.

While applicant does not wish to be bound by one particular theory, it would appear that in the cluster welding electrode assembly of this invention the smaller diameter or outer electrodes in combination with the central electrode or core provide individual arcs which transfer heat into the central core, thereby facilitating molten metal flow and avoiding excess metal in the cup, which would tend to produce a large amount of globular transfer. By the instant invention, there is effected a breakup of the globules of molten metal leaving the ends of the electrodes in fine particles, by reducing the adhesive force between the molten metal and the ends of the electrodes, or by changing the surface tension of the molten metal.

It can be seen from the foregoing that applicant has provided a cluster welding electrode assembly which permits the deposition of maximum weights of liquid weld metal utilizing minimum current and voltage values and which produces solidified weld metal of low carbon content having enhanced mechanical properties. These desirable results are achieved by the instant cluster electrode provided with a flux coating thereon the constituents of which are subject to relatively wide variations within the ranges set forth hereinabove. These and other modifications to the composition, welding method, and structure herein disclosed may, of course, be effected without departing from the spirit of the invention or the scope of the subjoined claims.

I claim:

1. A method of arc welding, which comprises creating an arc between a base/metal and an electrode tip provided by a cluster electrode formed of a flux coated solid central low carbon steel rod electrode and surrounding flux coated lessen diameter solid low carbon steel rod electrodes to produce liquid weld metal, and cooling the liquid weld metal to produce a low carbon alloy steel body having substantially the following composition, the balance being iron:

| INGREDIENT | FROM ABOUT % WEIGHT TO ABOUT % WEIGHT |
| --- | --- |
| Carbon | 0.01 to 0.15 |
| Manganese | 0.50 to 2.00 |
| Silicon | 0.05 to 1.00 |
| Chromium | 0.50 to 5.00 |
| Molybdenum | 0.25 to 2.50 |
| Nickel | 0.50 to 5.00 |
| Tungsten | 0.25 to 1.50 |
| Vanadium | 0 to 1.50 |
| Columbium | 0 to 1.00 |
| Cobalt | 0 to 2.00 |

2. A method of arc welding, which comprises creating an arc between base metal and an electrode tip provided by a cluster electrode formed of a flux coated solid central low carbon steel rod electrode and surrounding flux coated lessen diameter solid low carbon steel rod electrodes to produce liquid weld metal, and cooling the liquid weld metal to produce a low carbon alloy steel body, the flux coating on said rod electrodes having substantially the following composition:

| INGREDIENT | FROM ABOUT % WEIGHT TO ABOUT % WEIGHT |
| --- | --- |
| Manganese | 2 to 12 |
| Silicon | 2 to 10 |
| Iron | 5 to 35 |
| $CaCO_3$ | 20 to 60 |
| $CaF_2$ | 8 to 35 |
| Chromium | 3 to 12 |
| Silicate | 5 to 15 |
| Molybdenum | 0.05 to 10 |
| Tungsten | 0.05 to 10 |
| Nickel | 0.10 to 15 |
| Titanium | 0 to 15 |
| Vanadium | 0 to 3. |

3. A low carbon alloy steel body as produced by the method of claim 2.

4. A method of arc welding, which comprises creating an arc between a base metal and an electrode tip provided by a cluster electrode formed of a flux coated solid central low carbon steel rod electrode and surrounding flux coated lesser diameter solid low carbon steel rod electrodes to produce liquid weld metal, and cooling the liquid weld metal to produce a low carbon alloy steel body having substantially the following composition, the balance being iron:

| INGREDIENT | FROM ABOUT % WEIGHT TO ABOUT % WEIGHT |
| --- | --- |
| Carbon | 0.06 |
| Manganese | 1.35 |
| Silicon | 0.08 to 0.10 |
| Chromium | 3.00 to 3.50 |
| Molybdenum | 1.00 to 2.00 |
| Nickel | 1.50 |
| Tungsten | 0.25 to 1.50. |

5. A method of arc welding, which comprises creating an arc between a base metal and an electrode tip provided by a cluster electrode formed of a flux coated solid central low carbon steel rod electrode and surrounding flux coated lesser diameter solid low carbon steel rod electrodes to produce liquid weld metal, and cooling the liquid weld metal to produce a low carbon alloy steel body, the flux coating on said rod electrodes having substantially the following composition:

| INGREDIENT | APPROXIMATE PARTS BY WEIGHT |
| --- | --- |
| Manganese | 6 |
| Silicon | 8 |
| Iron | 10 |
| $CaCO_3$ | 50 |
| $CaF_2$ | 20 |
| Chromium | 12 |
| Silicate | 4 |
| Molybdenum | 6 |
| Nickel | 8 |
| Tungsten | 1.5. |

6. A low carbon alloy steel body as produced by the method of claim 5.

* * * * *